United States Patent
Liu (10) Patent No.: US 11,700,502 B2
(45) Date of Patent: Jul. 11, 2023

(54) SYSTEM, CONTROL UNIT, AND METHOD FOR DECIDING GEOFENCE EVENT OF VEHICLE

(71) Applicant: Robert Bosch GmbH, Stuttgart (DE)

(72) Inventor: Jason Liu, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 17/360,085

(22) Filed: Jun. 28, 2021

(65) Prior Publication Data

US 2021/0409897 A1 Dec. 30, 2021

(30) Foreign Application Priority Data

Jun. 30, 2020 (CN) .......................... 202010616994.5

(51) Int. Cl.
*H04W 4/021* (2018.01)
*H04W 4/029* (2018.01)
*G01S 13/931* (2020.01)
*H04W 4/40* (2018.01)

(52) U.S. Cl.
CPC .......... *H04W 4/021* (2013.01); *G01S 13/931* (2013.01); *H04W 4/029* (2018.02); *H04W 4/40* (2018.02); *G01S 2013/9316* (2020.01)

(58) Field of Classification Search
CPC ....... H04W 4/02; H04W 4/021; H04W 4/025; H04W 4/029; H04W 4/16; H04W 4/20; H04W 4/40; H04W 4/42; H04W 4/44; H04W 4/46; G01S 13/931; G01S 2013/9316

See application file for complete search history.

(56) References Cited

U.S. PATENT DOCUMENTS

| | | | | |
|---|---|---|---|---|
| 9,146,126 B2* | 9/2015 | Stroila | ............... | G06Q 30/0251 |
| 9,351,114 B2* | 5/2016 | Chatterjee | .......... | G06Q 30/0639 |
| 9,688,288 B1* | 6/2017 | Lathrop | ............... | G05D 1/0061 |
| 10,816,993 B1* | 10/2020 | Tran | ..................... | G05D 1/0088 |
| 11,370,435 B2* | 6/2022 | Zhao | .................. | G01C 21/3492 |
| 11,475,768 B2* | 10/2022 | Whelen | .................. | H04W 4/90 |

(Continued)

*Primary Examiner* — Jean A Gelin
(74) *Attorney, Agent, or Firm* — Maginot, Moore & Beck LLP (57) ABSTRACT

A system, a control unit, and a method for deciding a geofence event of a vehicle is disclosed. The control unit includes (i) a first road information generation module configured to generate first road information based on received map data and vehicle location data, the first road information including at least one or more candidate lanes based on a vehicle location, (ii) a second road information generation module configured to generate second road information based on received radar data, the second road information including at least a detected lane based on the radar data, (iii) a calculation module configured to perform integrated calculation on the first road information and the second road information to obtain a confidence level of each candidate lane, and determine a lane of the vehicle based on the calculated confidence level, and (iv) a decision module configured to decide, based on the determined lane, whether to trigger a geofence event, the geofence event including an event that the vehicle enters a geofence and an event that the vehicle exits a geofence.

16 Claims, 5 Drawing Sheets

(56) References Cited

U.S. PATENT DOCUMENTS

| | | | | |
|---|---|---|---|---|
| 2011/0071753 | A1* | 3/2011 | Chu | G01C 21/3658 |
| | | | | 701/533 |
| 2013/0096829 | A1* | 4/2013 | Kato | G01C 21/3859 |
| | | | | 701/533 |
| 2015/0141045 | A1* | 5/2015 | Qiu | H04W 4/021 |
| | | | | 455/456.1 |
| 2016/0026876 | A1* | 1/2016 | Koo | G06V 20/588 |
| | | | | 382/103 |
| 2017/0259832 | A1* | 9/2017 | Lathrop | G01C 21/3697 |
| 2018/0091940 | A1* | 3/2018 | Gonzalez | G01C 21/3697 |
| 2018/0122154 | A1* | 5/2018 | Grush | G08G 1/012 |
| 2018/0218600 | A1* | 8/2018 | Fujita | G08G 1/0112 |
| 2018/0342113 | A1* | 11/2018 | Kislovskiy | G07C 5/008 |
| 2019/0113918 | A1* | 4/2019 | Englard | G01C 21/3602 |
| 2019/0129039 | A1* | 5/2019 | Schubert | G08G 5/0021 |
| 2019/0164357 | A1* | 5/2019 | John | G01C 21/3658 |
| 2019/0276013 | A1* | 9/2019 | Kim | B60W 30/0956 |
| 2019/0299948 | A1* | 10/2019 | Maeda | B60T 8/171 |
| 2019/0347821 | A1* | 11/2019 | Stein | G08G 1/096725 |
| 2019/0357005 | A1* | 11/2019 | Brady | G06Q 50/30 |
| 2020/0056894 | A1* | 2/2020 | Kawabata | G08G 1/0969 |
| 2020/0064138 | A1* | 2/2020 | Takahama | G01C 21/3667 |
| 2020/0168080 | A1* | 5/2020 | Kim | B60W 30/18 |
| 2020/0191978 | A1* | 6/2020 | Stählin | G01S 19/43 |
| 2020/0219281 | A1* | 7/2020 | Ogata | G06T 7/73 |
| 2020/0247407 | A1* | 8/2020 | Huang | G01C 21/3819 |
| 2020/0250438 | A1* | 8/2020 | Schachter | G01C 21/30 |
| 2020/0307545 | A1* | 10/2020 | Park | F16H 61/16 |
| 2021/0019535 | A1* | 1/2021 | Qu | G01C 21/3461 |
| 2021/0180974 | A1* | 6/2021 | Kim | G01C 21/3415 |
| 2021/0183169 | A1* | 6/2021 | Borras | G01S 5/017 |
| 2021/0201590 | A1* | 7/2021 | Skidmore | H04W 4/029 |
| 2021/0241543 | A1* | 8/2021 | Nishioka | G07B 15/063 |
| 2021/0302979 | A1* | 9/2021 | McAlpine | G01C 21/3407 |
| 2021/0394797 | A1* | 12/2021 | Ran | B60W 60/0027 |
| 2021/0403037 | A1* | 12/2021 | Horigome | B62D 15/0255 |
| 2022/0046381 | A1* | 2/2022 | Ong | G08G 1/164 |
| 2022/0114885 | A1* | 4/2022 | Ran | B60W 50/14 |
| 2022/0147744 | A1* | 5/2022 | Hwang | G06V 20/588 |
| 2022/0204041 | A1* | 6/2022 | Oh | B60W 40/04 |
| 2022/0221298 | A1* | 7/2022 | Chikamori | G01C 21/362 |
| 2022/0315039 | A1* | 10/2022 | Wada | G01C 21/3896 |
| 2022/0319329 | A1* | 10/2022 | Kim | G08G 1/096725 |

* cited by examiner

SYSTEM, CONTROL UNIT, AND METHOD FOR DECIDING GEOFENCE EVENT OF VEHICLE

This application claims priority under 35 U.S.C. § 119 to patent application no. 202010616994.5, filed on Jun. 30, 2020 in China, the disclosure of which is incorporated herein by reference in its entirety.

The present disclosure relates to a system and a control unit for deciding a geofence event of a vehicle, and further relates to a method for deciding a geofence event.

BACKGROUND

With the advancement of network communications technologies, automated driving solutions develop from vehicle intelligence to coordination between a smart vehicle and smart roadside, which has greatly promoted the development of a smart city.

Geofencing will play an important role in the development of a smart city. This is because at present a vehicle equipped with a driver assistance system to have an automated driving function mainly enhances senses of a driver to reduce traffic accidents. However, with the development of vehicle automation and the internet of vehicles, to improve the safety of a traffic environment, vehicle technologies and geofencing need to be combined, that is, geofencing is to be used for automated driving.

The implementation of existing solutions of combining vehicle technologies and geofencing mainly relies on map data, positioning data based on navigation satellites, and camera data. However, roads on which geofencing is used for automated driving often include restricted roads, such as viaducts, expressways, and tunnels. For these restricted roads, a huge instability factor exists in the use of the positioning data based on navigation satellites and camera data. This is because positioning signals based on navigation satellites will become weak and even disappear in the areas of these roads, which leads to a positioning failure; and errors occur in environmental information acquired by a camera in situations such as strong light sources, light reflection from surface water, and lens distortion due to rainwater. This will cause a vehicle to make a wrong decision on geofencing and automated driving, and may even lead to a severe traffic accident.

Therefore, an improved technical solution is urgently required to solve the above problems in the prior art.

SUMMARY

In view of the above-mentioned problems in the prior art, the present disclosure is to provide a vehicle control solution that can decide a geofence event for a vehicle.

According to an embodiment of a first aspect of the present disclosure, there is provided a control unit for deciding a geofence event of a vehicle, the control unit comprising: a first road information generation module configured to generate first road information based on received map data and vehicle location data, the first road information comprising at least one or more candidate lanes based on a vehicle location; a second road information generation module configured to generate second road information based on received radar data, the second road information comprising at least a detected lane based on the radar data; a calculation module configured to perform integrated calculation on the first road information and the second road information to obtain a confidence level of each candidate lane, and determine a lane of the vehicle based on the calculated confidence level; and a decision module configured to decide, based on the determined lane, whether to trigger a geofence event, the geofence event comprising an event that the vehicle enters a geofence and an event that the vehicle exits a geofence.

According to an embodiment of a second aspect of the present disclosure, there is provided a system for deciding a geofence event of a vehicle, the system comprising: a networking apparatus configured to receive map data for automated driving; a positioning apparatus configured to receive a vehicle positioning signal and generate vehicle location data; a radar sensor configured to capture road information of a road in front of the vehicle and generate radar data; and the control unit as described above configured to perform integrated calculation on the map data, the vehicle location data, and the radar data, and decide whether to trigger a geofence event, the geofence event comprising an event that the vehicle enters a geofence and an event that the vehicle exits a geofence.

According to an embodiment of a third aspect of the present disclosure, there is provided a method for deciding a geofence event of a vehicle, wherein optionally, the method is performed by the control unit as described above and/or the system as described above, the method comprising: generating first road information based on received map data and vehicle location data, the first road information comprising at least one or more candidate lanes based on a vehicle location; generating second road information based on received radar data, the second road information comprising at least a detected lane based on the radar data; performing integrated calculation on the first road information and the second road information to obtain a confidence level of each candidate lane, and determining a lane of the vehicle based on the calculated confidence level; deciding, based on the determined lane, whether to trigger a geofence event, the geofence event comprising an event that the vehicle enters a geofence and an event that the vehicle exits a geofence.

According to an embodiment of a fourth aspect of the present disclosure, there is provided a machine-readable medium storing machine-readable instructions that, when executed, cause a machine to perform the method as described above.

It can be learned that, according to the embodiments of the present disclosure, by means of integrated processing of the map data and the radar data, false determination of the lane of the vehicle is eliminated, the stability and accuracy of deciding a geofence event are improved, and the cost is low.

DETAILED DESCRIPTION

Considering various obstacles to a decision of a geofence event in the prior art, the inventor finds that for road types that are included in a geofence, physical metal and concrete are usually used as media for separation, such as barriers or noise walls on both sides of a road, which are exactly features that a radar excels at detecting. The inventor also finds that with the aid of radar data detected by a vehicle-borne radar (particularly a millimeter-wave radar that is not expensive but has great detection performance for metal barriers, light posts, bridges, etc.) with which a driver assistance system of a vehicle is equipped and map data of a high-precision map for automated driving, a lane of the vehicle can be determined, and thereby it can be decided whether to trigger a geofence event. The inventor also designs an integrated calculation method for the radar data and the map data. By using such an integrated calculation method, the lane of the vehicle can be efficiently and stably identified, thereby improving the efficiency and accuracy of a decision.

Embodiments of the present disclosure mainly relate to a vehicle control solution for deciding a geofence event for a vehicle. Before the embodiments of the present disclosure are described, the terms "geofence" and "geofence event" appearing in the description and claims are first explained.

In the embodiments of the present disclosure, a "geofence" can be understood as a virtual perimeter based on a real map, and its attribute and shape can both be dynamically generated and defined. The geofence can be implemented as an intangible perimeter defined by coordinates such as global positioning system (GPS) coordinates. The present disclosure does not limit a method for generating a geofence.

In the embodiments of the present disclosure, the "geofence event" can be understood as including an event that a vehicle enters a geofence area and an event that a vehicle exits a geofence area.

According to the embodiments of the present disclosure, after the event that a vehicle enters a geofence is triggered, the vehicle enables automated driving (for example, automated driving above level L2), and performs a series of control strategies (such as environment perception, behavior planning, and trajectory prediction) of automated driving.

According to the embodiments of the present disclosure, after the event that a vehicle exits a geofence is triggered, the vehicle ends automated driving and allows a driver to take over the vehicle.

Therefore, accurately deciding a geofence event plays an important role in the safety of automated driving of a vehicle.

It can be understood that, "entering a geofence" may comprise two situations: the vehicle will immediately enter the geofence, and the vehicle is about to enter the geofence. An occasion on which the vehicle enters the geofence can be defined by a predetermined time and/or a predetermined distance, that is, how long and/or how far the vehicle will travel further to enter the geofence. Then the vehicle can be prepared for starting automated driving.

It can be understood that, "exiting a geofence" may comprise two situations: the vehicle will immediately exit the geofence, and the vehicle is about to exit the geofence. An occasion on which the vehicle exits the geofence can be defined by a predetermined time and/or a predetermined distance, that is, how long and/or how far the vehicle will travel further to exit the geofence. Then the vehicle can notify the driver in advance to prepare to take over the vehicle.

Some embodiments of the present disclosure are described below with reference to the accompanying drawings.

Figure 1:
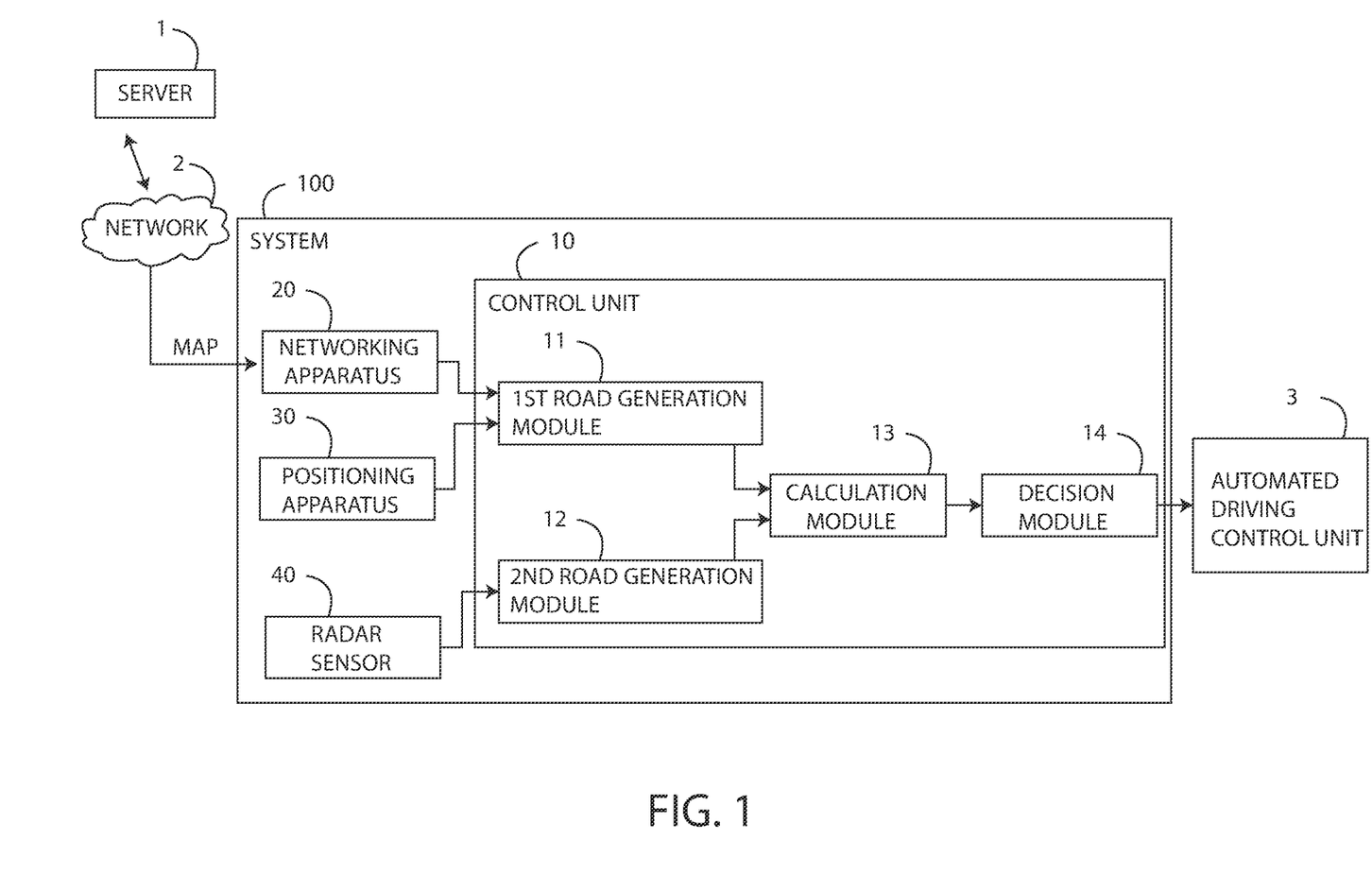
FIG. 1 is a schematic block diagram of a system for deciding a geofence event of a vehicle according to a feasible implementation of the present disclosure, wherein the system comprises a control unit according to a feasible implementation of the present disclosure.

FIG. 1 schematically shows a system 100 for deciding a geofence event of a vehicle according to a feasible implementation of the present disclosure, the system mainly comprising: a control unit 10, a networking apparatus 20, a positioning apparatus 30, and a radar sensor 40.

The networking apparatus 20 is provided on the vehicle and may implement a networking function of the vehicle, such as vehicle-to-everything communication (V2X communication), vehicle-to-infrastructure communication (V2I communication), and vehicle-to-vehicle communication (V2V communication). Referring to FIG. 1, the networking apparatus 20 may be communicatively connected to a server 1 via a network 2. The networking apparatus 20 is configured to receive, from the server 1, a map MAP for automated driving.

In an embodiment, the server 1 may be implemented as a map cloud for automated driving, in which the map MAP for automated driving is stored, such as a high-precision map. The networking apparatus 20 may obtain the map MAP for automated driving, for example, download the map MAP from the map cloud via the network 2. In this embodiment, the network 2 is typically implemented as a wireless network, and the wireless network may be based on any radio communications technology and/or standard. For example, the network 2 may comprise any standard of telecommunications network provided by a telecommunications operator. Although a single network 2 is shown in FIG. 1, the network 2 may be configured as comprising a plurality of networks.

In another embodiment, the network 2 may further comprise the Internet of things (IoT). For example, the network 2 may be implemented as an ad hoc wireless network. A vehicle having a networking function, as a node, may have a function of discovering other nodes that can establish an ad hoc wireless network with the vehicle, and these nodes may comprise roadside facilities, mobile terminals, etc. within a communication range of the vehicle. Examples of the network 2 may include but is not limited to a wireless local area network (WLAN), an infrared (IR) network, a Bluetooth network, a near-field communication (NFC) network, a ZigBee network, etc. In this embodiment, the networking apparatus 20 may obtain, via the network 2, the map MAP from a roadside server or an edge server that store the map MAP.

The positioning apparatus 30 may locate the vehicle by means of a positioning signal from a vehicle navigation system and generate vehicle location data comprising a location of the vehicle. For example, the positioning apparatus 30 may be implemented as a vehicle-borne GPS.

The radar sensor 40 is provided on the vehicle and configured to detect road information of a road in front of the vehicle and generate radar data. The radar data may comprise radar data of a plurality of radar detection points (radar wave reflection points). The radar sensor 40 may comprise one or more of a laser radar, a millimeter-wave radar, and an ultrasonic radar. In an embodiment, the radar sensor 40 is implemented as a long-range millimeter-wave radar provided at the front of the vehicle.

The control unit 10 is configured to perform the following vehicle control strategy, that is, performing integrated calculation on the map data, the vehicle location data, and the radar data, identifying a lane of the vehicle, and then deciding, based on the determined lane, whether to trigger a geofence event. In a process of deciding whether to trigger the geofence event, the following can be considered: (1) auxiliary map information obtained from the map data; and/or (2) auxiliary radar information obtained from the radar data, so as to assist a decision on the geofence event.

The control unit 10 may be provided in an electronic control unit (ECU) of the vehicle, that is, the control unit 10 may be implemented by means of the electronic control unit (ECU) in the vehicle.

Still referring to FIG. 1, the control unit 10 may be communicatively connected to an automated driving control unit 3 (namely, a control unit for the driver assistance system) of the vehicle, so as to transmit the decision on the geofence event to the automated driving control unit 3. After receiving the decision, the automated driving control unit 3 may perform an automated driving control strategy. For example, in response to a decision on an event of entering a geofence, the automated driving control unit 3 performs behavior planning and route prediction.

The control unit 10 may be implemented by means of software or hardware or a combination of software and hardware. In an embodiment, the control unit 10 comprises a memory and a processor. The memory comprises instructions that, when executed by the processor, cause the processor to perform at least the above integrated calculation and make the above decision.

In this embodiment, the memory have a plurality of implementations. For example, the memory may be implemented as a portable computer disk, a hard disk, a random access memory (RAM), a read-only memory (ROM), an erasable programmable read-only memory (EPROM or a flash memory), an optical storage device, a magnetic storage device, or an appropriate combination thereof.

In this embodiment, the processor have a plurality of implementations. For example, the processor may be implemented as a general-purpose processor, a digital signal processor (DSP), an application-specific integrated circuit (ASIC), a field programmable gate array (FPGA) or other programmable logic devices, a discrete gate or transistor logic, a discrete hardware component, or an appropriate combination thereof. The general-purpose processor may be a microprocessor, a controller, or a microcontroller. The processor may also be implemented as a combination of computing devices, such as a combination of a DSP and a microprocessor, a plurality of microprocessors, a combination of one or more microprocessors and a DSP kernel, or other similar structures.

Still referring to FIG. 1, the control unit 10 mainly comprises a first road information generation module 11, a second road information generation module 12, a calculation module 13, and a decision module 14. These modules may be implemented as software modules. One or more of these modules may be combined or further divided into a plurality of submodules depending on specific application situations.

It can be understood that the names of the modules 11 to 14 of the control unit 10 should be understood as a logical description instead of a limitation on a physical form or an arrangement manner. In other words, one or more of the modules 11 to 14 may be implemented in the same chip or circuit, or may be respectively provided in different chips or circuits, which is not limited in the present disclosure. If an onboard control unit have the functions of the modules of the control unit 10, it should be understood that the onboard control unit comprises these modules.

A working principle of the control unit 10 will be described below with reference to FIGS. 1 to 4.

Figure 2:
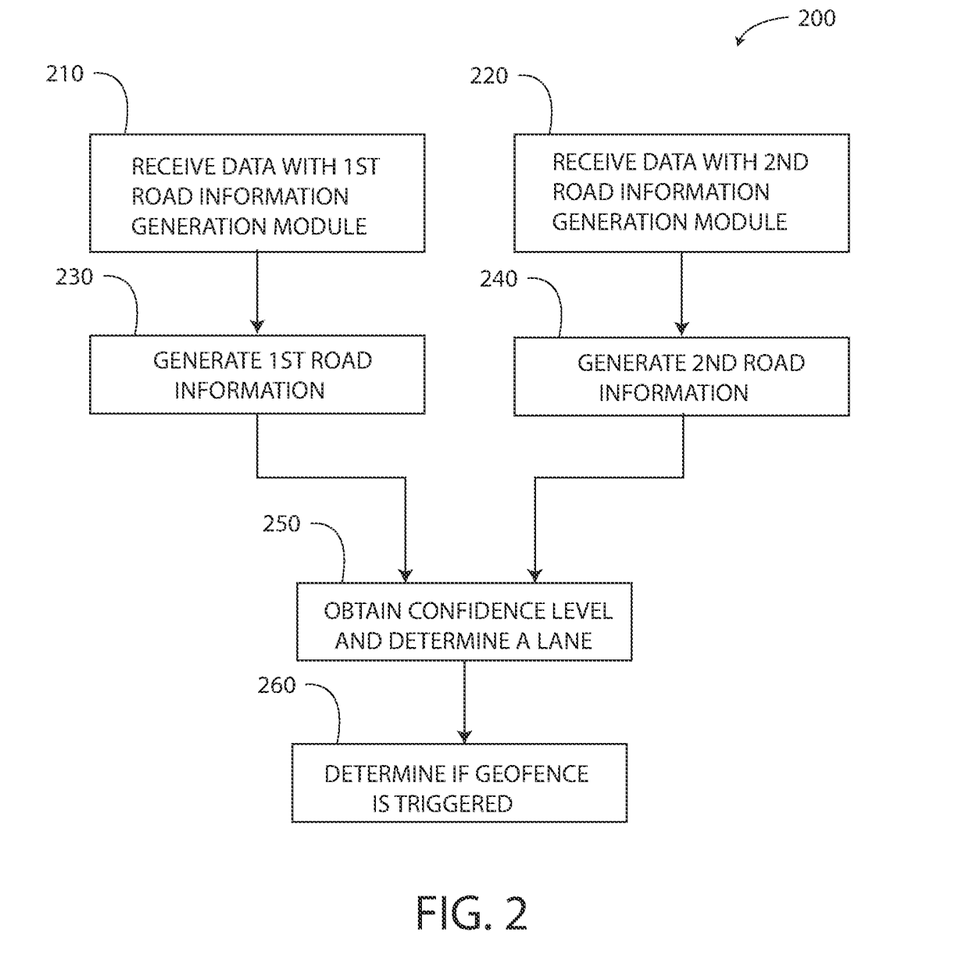
FIG. 2 schematically shows an exemplary process of deciding a geofence event according to a feasible implementation of the present disclosure.

FIG. 2 schematically shows an exemplary process 200 of deciding a geofence event according to a feasible implementation of the present disclosure, wherein the process 200 may be performed in the control unit 10.

The first road information generation module 11 receives (block 210) map data and vehicle location data, and generates (block 230) first road information based on the map data and the vehicle location data. The map data may be from a high-precision map for automated driving. The vehicle location data may be from a positioning apparatus 30.

The first road information comprises at least one or more candidate lanes based on a vehicle location. In an embodiment, the module 11 extracts one or more candidate lanes within a predetermined search range (for example, an area defined by a predetermined 10 m*10 m square search box) from the high-precision map MAP based on the vehicle location and the predetermined search range. The module 11 may further calculate a boundary of each candidate lane according to the map data.

In addition, when no road or lane is found in the predetermined search range, the search range may be expanded (for example, the predetermined 10 m*10 m search box is expanded to a 20 m*20 m search box) until a candidate road is found.

The first road information may further comprise auxiliary map information. For example, after determining the candidate lane, the module 11 may extract information related to the candidate lane from the high-precision map as the auxiliary map information.

The auxiliary map information may comprise one or more of the following: (1) a road class (such as a highway/an expressway/an urban expressway/a national road/a provincial road/a county and township road); (2) a road type (such as a main road/a side road); (3) a lane type (such as a normal lane/an emergency lane); and (4) a boundary type and shape of the candidate lane (for example, the boundary type may include material information of a boundary barrier of the candidate lane, wherein the material information may indicate whether a boundary is made of media such as concrete and metal that can be detected by a radar sensor; and the shape may include geometric shape information of the candidate lane, such as a straight lane, an arc-shaped lane, and an intersection relationship between a plurality of lanes). The information can assist a decision on a geofence event of a vehicle.

It can be understood that although the vehicle location can be learned based on the vehicle location data, the accuracy of the vehicle location may be not high. Particularly, in scenarios such as parallel lanes, intersected lanes, and viaducts, a deviation may occur in vehicle lane positioning. Therefore, the following control strategy is required to eliminate a vehicle lane positioning deviation, so that the lane of the vehicle is accurately and stably learned.

The second road information generation module 12 receives (block 220) radar data, and generates (block 240) second road information based on the radar data. The radar data may be from the radar sensor 40 and comprise distance information and/or speed information detected by the radar sensor 40 within a detection range thereof. The radar data may comprise data of a plurality of radar detection points (reflection points).

The second road information comprises at least a boundary of a detected lane based on the radar data. In an embodiment, the module 12 fits a line-shaped pattern to the plurality of radar detection points, and uses the line-shaped pattern as the boundary of the detected lane (for example, information such as a barrier, a concrete pier, and a noise wall at a road boundary).

The second road information may further comprise auxiliary radar information. The auxiliary radar information may comprise speed information based on the radar data. For example, the radar sensor 40 may capture vehicle speed information of the current lane and surrounding lanes, and the module 12 can calculate an average vehicle speed of the lanes based on the vehicle speed information.

It can be understood that the present disclosure does not limit the order in which the control unit 10 receives the radar data, the map data, and the vehicle location data, and these data may be received by the control unit 10 simultaneously, or may be received by the control unit 10 in respective predetermined periods. In other words, block 210 and block 220 can be performed simultaneously, or may be performed in respective predetermined periods.

Then the calculation module 13 performs integrated calculation on the first road information and the second road information to obtain a confidence level of each candidate lane, and determine a lane of the vehicle based on the calculated confidence level (block 250).

In this embodiment of the present disclosure, a confidence level of a candidate lane may be understood as a matching degree between the candidate lane and the detected lane. In other words, the higher the confidence level of the candidate lane, the more likely the candidate lane is determined as the lane of the vehicle.

The calculation module 13 may consider two factors, the value of the confidence level and a confidence level threshold, to determine the lane of the vehicle. The confidence level threshold may be determined based on one or more factors among experience, model calculation, or a vehicle field test.

In the case that there is only one candidate lane, when a calculated confidence level of the lane is greater than or equal to the confidence level threshold, the lane is determined as the lane of the vehicle. When the calculated confidence level of the lane is less than the confidence level threshold, it is considered that the lane of the vehicle is not found. In the case that the lane of the vehicle is not found, with dynamic changes of the vehicle (traveling of the vehicle), new data may be received and a confidence level may continue to be calculated based on the new data, until the lane of the vehicle is found.

In the case that there are a plurality of candidate lanes, a lane with a confidence level being the highest in calculated confidence levels and greater than or equal to the confidence level threshold is determined as the lane of the vehicle. In other words, even though the lane with the highest confidence level is selected, but the highest confidence level is still less than the confidence level threshold, it is considered that the lane of the vehicle is not found. In the case that the lane of the vehicle is not found, with traveling of the vehicle, new data may be received and a confidence level may continue to be calculated based on the new data, until the lane of the vehicle is found.

The confidence level of the candidate lane may be calculated based on a plurality of types of confidence levels. In an embodiment, the confidence level of the candidate lane may be calculated based on one or more of the following: (1) a first confidence level associated with the shortest distance between the vehicle location and each candidate lane, for example, the first confidence level may be calculated based on the shortest distance between the vehicle location and each candidate lane; (2) a second confidence level associated with a distance between the vehicle location and each radar detection point, for example, the second confidence level may be calculated based on the distance between the vehicle location and each radar detection point; and (3) a third confidence level associated with the shortest distance between a detection point on the boundary of the detected lane and the boundary of each candidate lane, for example, the third confidence level may be calculated based on the shortest distance between the detection point on the boundary of the detected lane and the boundary of each candidate lane.

In an embodiment, the confidence level of the candidate lane may be calculated using the following formula:

$$C_i = W_1 * C_{i1} + W_2 * C_{i2} + W_3 * C_{i3},$$

where $C_i$ denotes a confidence level of an $i^{th}$ candidate lane; $C_{i1}$ denotes a first confidence level of the $i^{th}$ candidate lane, and $W_1$ denotes a weight of $C_{i1}$; $C_{i2}$ denotes a second confidence level of the $i^{th}$ candidate lane, and $W_2$ denotes a weight of $C_{i2}$; and $C_{i3}$ denotes a third confidence level of the $i^{th}$ candidate lane, and $W_3$ denotes a weight of $C_{i3}$.

In the embodiment, the weights $C_{i1}$ to $C_{i3}$ of the confidence levels are adjustable. For example, depending on specific application scenarios, the weights of different types of confidence levels are adjusted.

Some calculation examples of the first, second, and third confidence levels are described below in the form of examples.

Figure 3:
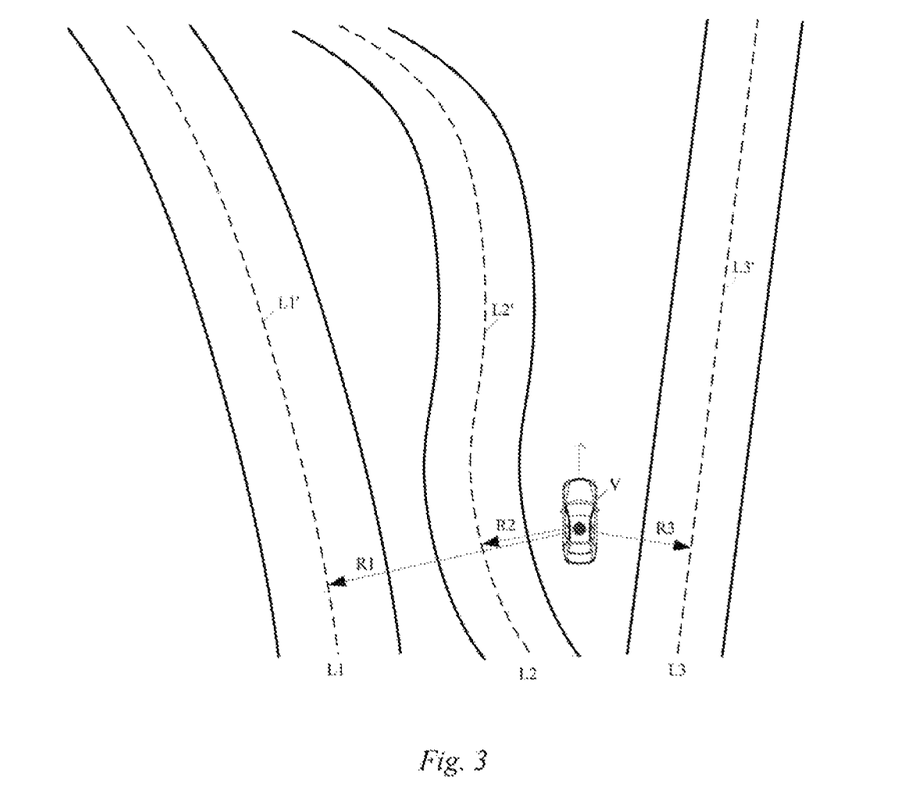
FIG. 3 schematically shows a calculation principle of a first confidence level according to a feasible implementation of the present disclosure.

In an embodiment of calculating the first confidence level, the calculation module 13 calculates the shortest distance between the vehicle location in a lateral direction of the vehicle and a center line of each candidate lane, and determines the first confidence level based on the shortest distance. The shorter the shortest distance between the vehicle location and the center line of a candidate lane, the higher the first confidence level of the candidate lane. The center line of each candidate lane may be obtained from the high-precision map.

Referring to FIG. 3, a first confidence level of a first candidate lane L1 is determined based on the shortest distance R1 between a location of the vehicle V (such as a center or a centroid of the vehicle V) and the center line L1' of the lane L1. Similarly, a first confidence level of a second candidate lane L2 is determined based on the shortest distance R2 between the location of the vehicle V and the center line L2' of the lane L2. A first confidence level of a third candidate lane L3 is determined based on the shortest distance R3 between the location of the vehicle V and the center line L3' of the lane L3. As shown in FIG. 3, the candidate lanes L1 to L3 may comprise a curved lane, and the candidate lanes L1 to L3 may intersect with each other. Therefore, as the vehicle V travels, the first confidence level of each candidate lane changes.

It can be understood that how to calculate the shortest distance between the above vehicle and the center of the lane is not limited in the present disclosure. For a straight lane or a curved lane, any suitable calculation method may be used for implementation.

Figure 4:
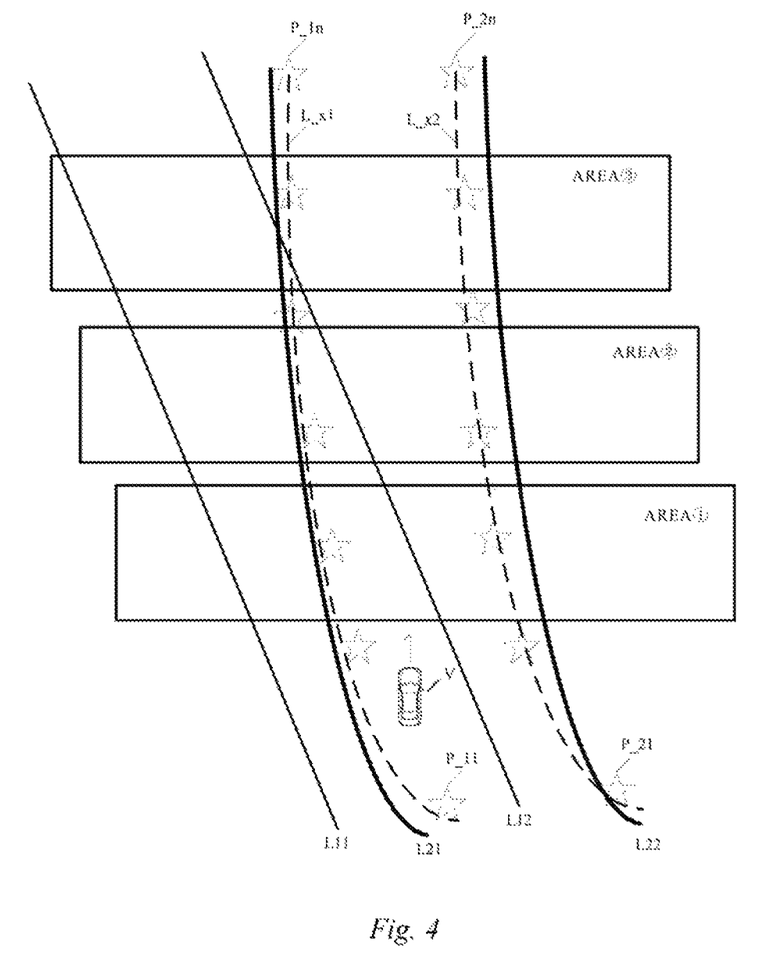
FIG. 4 schematically shows a calculation principle of a second confidence level and a third confidence level according to a feasible implementation of the present disclosure.

In an embodiment of calculating the second confidence level, a distance between each detection point on a radar detection line and a current location of the vehicle is calculated, and the second confidence level is determined based on the distance. The longer the distance, the lower the second confidence level.

In another embodiment of calculating the second confidence level, the second confidence level may be calculated by setting a confidence interval. For example, starting from the current location of the vehicle, a plurality of confidence intervals are set in the heading direction of the vehicle and a confidence level is allocated to each confidence interval. For allocation of the confidence level, one method is: the farther the confidence interval is away from the vehicle in the heading direction of the vehicle, the lower the confidence level of the confidence interval. Another method is: in each confidence interval, the distance between each radar detection point and the vehicle location is calculated, and the confidence level of the confidence interval is allocated according to the calculated distance.

Referring to FIG. 4, three confidence intervals are set in the heading direction of the vehicle, that is, a first confidence interval AREA ① (for example, the distance to the vehicle location ranges 5 m to 50 m), a second confidence interval AREA ② (for example, the distance to the vehicle location ranges from 50 m to 100 m), and a third confidence interval AREA ③ (for example, the distance to the vehicle location is at least 100 m). For the three confidence intervals, the confidence level of the first confidence interval AREA ① is greater than the confidence level of the second confidence interval AREA ②, and the confidence level of the second confidence interval AREA ② is greater than the confidence level of the third confidence interval AREA ③.

It can be understood that as the vehicle travels, each confidence interval will move forward. The design of the second confidence interval fully considers detection characteristics of the radar sensor, that is, a capability of detecting a close object is higher than a capability of detecting a far object. Then a detection result of a close detection point is set to a high confidence level, and a detection result of a far detection point is set to a low confidence level, which can improve the objectivity and accuracy of the calculation result.

In an embodiment of calculating the third confidence level, the calculation module 13 matches the boundary of the detected lane with the boundary of each candidate lane, and determines the third confidence level based on a matching degree. The higher the matching degree, the higher the third confidence level.

Referring to FIG. 4, P_11 to P_1n and P_21 to P_2n (see "k" signs in FIG. 5) denote radar detection points. A dashed line L_x1 connecting the radar detection points P_11 to P_1n and a dashed line L_x2 connecting the radar detection points P_21 to P_2n are two boundaries (radar detection lines) of the detected lane. L11 and L12 are two boundaries of a first candidate lane. L21 and L22 are two boundaries of a second candidate lane. When the boundaries of the candidate lane are matched with the boundaries of the detected lane, by using the heading direction of the vehicle as a reference, the left boundary of the detected lane is matched with the left boundary of the candidate lane, and the right boundary of the detected lane is matched with the right boundary of the candidate lane.

For example, the left boundary L_x1 of the detected lane is matched with the left boundary L21 of the second candidate lane, the shortest distance between each detection point on L_x1 and L21 is calculated, and the sum of all the shortest distances is calculated. The smaller the sum of the shortest distances, the higher the matching degree. Similarly, a matching degree between the right boundary L_x2 of the detected lane and the right boundary L22 of the second candidate lane may be calculated. In this way, a third confidence level of the second candidate lane may be obtained based on the matching degrees of the left and right boundaries. In the same way, third confidence levels of other candidate lanes may be calculated.

In this embodiment, the determination of the third confidence level may further consider the second confidence level, that is, the third confidence level is determined based on both the shortest distance between the above detection point and the boundary of the candidate lane and the second confidence level. For example, the third confidence level may be calculated for each confidence interval. The shortest distance between the detection point and the boundary of the candidate lane is multiplied by a weight of a confidence interval where the detection point is located. The farther the confidence interval is away from the vehicle, the lower the weight. That is, the interval closest to the vehicle (for example, the first confidence interval) has the highest weight, and the interval farthest from the vehicle (for example, the third confidence interval) has the lowest weight.

It can be understood that this embodiment of the present disclosure is intended for integration of the map data and the radar data, thereby eliminating the problem of lane false determination, so as to provide an accurate geofence event decision for the vehicle. This embodiment of the present disclosure may comprise any matching algorithm, confidence level algorithm, and combined calculation method of various types of confidence levels that are suitable for achieving the foregoing objective, and they are not limited to the foregoing examples.

Next, the decision module 14 decides (block 260), according to the determined lane, whether to trigger a geofence event for the vehicle, that is, determines, based on the current lane of the vehicle (the current traveling lane), whether the vehicle enters a geofence to enable automated driving, or determines, based on the current lane of the vehicle (the current traveling lane), whether the vehicle exits a geofence to disable automated driving.

In this process, the module 14 may further consider some reference factors to assist in decision making.

In an embodiment, the module 14 may consider the above auxiliary map information to assist in decision making. For example, although a decision that the vehicle enters the geofence can be made based on the determined lane, according to the requirements of the geofence and an automated driving system, the geofence event is triggered and the automated driving is performed only on a highway. However, according to the auxiliary map information, it can be learned that the current road is a provincial road (that is, not a highway), and then the module 14 makes a decision that the geofence event is not triggered.

In another embodiment, the module 14 may consider the above auxiliary radar information to assist in decision making. For example, although the decision that the vehicle enters the geofence can be made based on the determined lane, according to the requirements of the geofence and the automated driving system, the geofence event is triggered and the automated driving is performed only on a highway. However, according to the auxiliary radar information, it can be learned that an average vehicle speed on the current road are far lower than the vehicle speed on the highway, and then the module 14 takes measures such as lowering the calculated confidence level or recalculating the confidence level. In this embodiment, the detection of the dynamic vehicle by the radar is integrated with the speed limits of the lane to further improve safety and reliability.

It can be understood that in the decision process, the module 14 may consider one or both of the above auxiliary map information and auxiliary radar information.

Applications of this embodiment of the present disclosure in typical scenarios are described below.

A plurality of parallel roads may comprise lanes with different limitation types. Positioning based on a vehicle navigation signal can hardly identify which lane of the plurality of parallel lanes a vehicle is in. For the application scenario of parallel roads, a geofence area where automated driving is performed may comprise only one lane, rather than all the lanes. According to this embodiment of the present disclosure, the radar can detect information about barriers on both sides of a road, that is, the boundaries of the above detected lane. The barrier information detected by the radar is integrated with lane line information in the map data to determine which lane of the plurality of lanes the vehicle is in.

For an application scenario of a viaduct road, the geofence area that the automated driving may be performed may comprise only a lane above the viaduct, but does not comprise a lane under the viaduct. Positioning based on a vehicle navigation signal can hardly identify whether a vehicle is on the lane above the viaduct or on the lane under the viaduct. It can be considered that there are barriers on both sides of the road above the viaduct, and there is usually a barrier only on the right side (using the heading direction of the vehicle as a reference) of the lane under the viaduct. According to this embodiment of the present disclosure, the radar can detect information about barriers on boundaries of a road. The barrier information detected by the radar is integrated with viaduct road information in the map data, so that whether the vehicle is on the lane above the viaduct or on the lane under the viaduct can be determined.

It can be learned that the embodiments of the present disclosure do not involve precise positioning of the vehicle, but are intended to eliminate false determination of a traveling lane of the vehicle. Therefore, according to this embodiment of the present disclosure, a huge amount of positioning map data is not required, but only map data of related roads and lanes in a high-precision map need to be obtained, and then the map data and radar data are integrated, to solve the problem of lane false determination, thereby providing an accurate geofence event decision.

Figure 5:
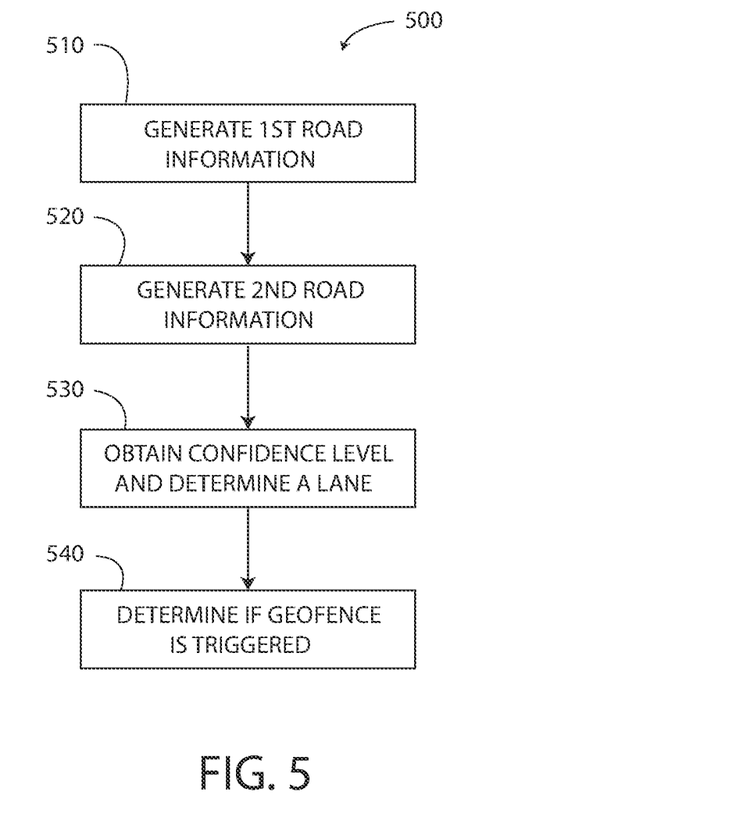
FIG. 5 is a flowchart of a method for deciding a geofence event of a vehicle according to a feasible implementation of the present disclosure.

FIG. 5 shows a method 500 for deciding a geofence event of a vehicle according to a feasible implementation of the present disclosure. The method 500 may be performed by the control unit 10 as described above and/or the system 100 as described above, and therefore the description about the control unit 10 and the system 100 is also applicable here.

Referring to FIG. 5, in step 510, first road information is generated based on received map data and vehicle location data, the first road information comprising at least one or more candidate lanes based on a vehicle location.

In step 520, second road information is generated based on received radar data, the second road information comprising at least a detected lane based on the radar data.

In step 530, integrated calculation is performed on the first road information and the second road information to obtain a confidence level of each candidate lane, and a lane of the vehicle is determined based on the calculated confidence level.

In step 540, it is decided, based on the determined lane, whether to trigger a geofence event, the geofence event comprising an event that the vehicle enters a geofence and an event that the vehicle exits a geofence.

The above step 510 and step 520 may be performed in any order or may be performed simultaneously.

It can be understood that all operations in the method described above are only exemplary, and the present disclosure is not limited to any operations in the method or the order of these operations, but should cover all other equivalent transformations under the same or similar concepts.

The present disclosure further provides a machine-readable storage medium storing executable instructions that, when executed, cause a machine to perform the method 500 as described above.

It can be understood that the control unit and modules described above can be implemented in various manners. For example, the control unit and modules may be implemented as hardware, software, or a combination thereof.

The control unit may comprise one or more processors. These processors can be implemented using electronic hardware, computer software, or any combination thereof. Whether these processors are implemented as hardware or software may depend on a specific application and overall design constraints imposed on the system. As an example, the processor, any part of the processor, or any combination of processors provided in the present disclosure can be implemented as a microprocessor, a microcontroller, a digital signal processor (DSP), a field programmable gate array (FPGA), a programmable logic device (PLD), a state machine, a gate logic, a discrete hardware circuit, and other suitable processing components configured to perform the various functions described in the present disclosure. Functions of the processor, any part of the processor, or any combination of the processors provided in the present disclosure can be implemented as software executed by a microprocessor, a microcontroller, a DSP, or other suitable platforms.

The software may be broadly regarded as representing instructions, instruction sets, codes, code segments, program codes, programs, subprograms, software modules, applications, software applications, software packages, routines, subroutines, objects, running threads, processes, functions, etc. The software can reside in a computer-readable medium. The computer-readable medium may comprise, for example, a memory, and the memory may be, for example, a magnetic storage device (such as a hard disk, a floppy disk, and a magnetic stripe), an compact disk, a smart card, a flash memory device, a random access memory (RAM), a read-only memory (ROM), a programmable ROM (PROM), an erasable PROM (EPROM), an electrically erasable PROM (EEPROM), a register or a removable disk. Although the memory is shown to be separate from the processor in the various aspects presented in the present disclosure, the memory may also be located inside the processor (such as a cache or a register).

The above description is provided to enable any person skilled in the art to implement the various aspects described herein. Various modifications in these aspects are obvious to those skilled in the art, and the general principles defined herein can be applied to other aspects. Therefore, the claims are not intended to be limited to the aspects shown herein. All structural and functional equivalent changes to the elements of the various aspects of the present disclosure that are known or about to be known to those skilled in the art will be expressly included in this text by reference and are intended to be covered by the claims.

What is claimed is:

1. A control unit for deciding a geofence event of a vehicle, comprising:
a first road information generation module configured to generate first road information based on received map data and vehicle location data, the first road information comprising at least one or more candidate lanes based on a vehicle location;
a second road information generation module configured to generate second road information based on received radar data, the second road information comprising at least a detected lane based on the radar data;
a calculation module configured to perform integrated calculation on the first road information and the second road information to obtain a confidence level of each candidate lane, and determine a lane of the vehicle based on the calculated confidence level; and
a decision module configured to decide, based on the determined lane, whether to trigger a geofence event, the geofence event comprising an event that the vehicle enters a geofence and an event that the vehicle exits a geofence,
wherein the first road information generation module is configured to extract one or more candidate lanes in a predetermined search range and information related to the one or more candidate lanes in the map data according to the vehicle location and the predetermined search range, and determine a boundary of each candidate lane.

2. The control unit of claim 1, wherein:
in the case that there is only one candidate lane, when a calculated confidence level of the one lane is greater than or equal to a confidence level threshold, the calculation module determines the one lane as the lane of the vehicle; or
in the case that there are a plurality of candidate lanes, the calculation module determines, as the lane of the vehicle, a lane with a confidence level being the highest in calculated confidence levels and greater than or equal to the confidence level threshold.

3. The control unit of claim 1, wherein the confidence level of each candidate lane is calculated based on one or more of the following:
a first confidence level associated with the shortest distance between the vehicle location and the center line of each candidate lane;
a second confidence level associated with a distance between the vehicle location and each radar detection point; and
a third confidence level associated with a matching degree between a boundary of the detected lane and a boundary of each candidate lane.

4. The control unit of claim 3, wherein the confidence level is determined using the following formula:

$$C_i = W_1 * C_{i1} + W_2 * C_{i2} + W_3 * C_{i3},$$

where $C_i$ denotes a confidence level of an $i^{th}$ candidate lane; $C_{i1}$ denotes a first confidence level of the $i^{th}$ candidate lane, and $W_1$ denotes a weight of $C_{i1}$; $C_{i2}$ denotes a second confidence level of the $i^{th}$ candidate lane, and $W_2$ denotes a weight of $C_{i2}$; and $C_{i3}$ denotes a third confidence level of the $i^{th}$ candidate lane, and $W_3$ denotes a weight of $C_{i3}$.

5. The control unit of claim 4, wherein the weights $C_{i1}$ to $C_{i3}$ are adjustable.

6. The control unit of claim 3, wherein the calculation module is configured to set a plurality of confidence intervals in the heading direction of the vehicle, and allocate a confidence level, as the second confidence level, to each confidence interval according to a distance between a radar detection point in each confidence interval and the vehicle.

7. The control unit of claim 3, wherein the calculation module is configured to determine the third confidence level based on the shortest distance between a detection point on the boundary of the detected lane and the boundary of the candidate lane.

8. The control unit of claim 7, wherein the third confidence level is determined based on both (1) the shortest distance between the detection point on the boundary of the detected lane and the boundary of the candidate lane; and (2) the second confidence level.

9. The control unit of claim 1, wherein:
the first road information further comprises auxiliary map information, and the decision module considers the auxiliary map information when making the decision; and
the auxiliary map information comprises one or more of the following: a road class, a road type, a lane type, and a boundary type and shape of the candidate lane.

10. The control unit of claim 1, wherein:
the second road information further comprises auxiliary radar information, and the decision module considers the auxiliary radar information when making the decision; and
the auxiliary radar information comprises average vehicle speeds of the current lane and surrounding lanes.

11. The control unit of claim 1, wherein the control unit is communicatively connected to an automated driving control unit of the vehicle to transmit a decision on the geofence event to the automated driving control unit.

12. A method for deciding a geofence event of a vehicle, wherein the method is performed by the control unit of claim 1, the method comprising:
generating first road information based on received map data and vehicle location data;
generating second road information based on received radar data;
performing integrated calculation on the first road information and the second road information to obtain the confidence level of each candidate lane, and to determine the lane of the vehicle; and
deciding, based on the determined lane, whether to trigger a geofence event.

13. The control unit of claim 1, wherein when no candidate lane is obtained in the predetermined search range, the predetermined search range is expanded.

14. A system for deciding a geofence event of a vehicle, comprising:
a networking apparatus configured to receive map data for automated driving;
a positioning apparatus configured to receive a vehicle positioning signal and generate vehicle location data;
a radar sensor configured to capture information of a road in front of the vehicle and generate radar data; and
a control unit configured to decide the geofence event of the vehicle, the control unit including:
a first road information generation module configured to generate first road information based on the received map data and the generated vehicle location data, the first road information comprising at least one or more candidate lanes based on a vehicle location,
a second road information generation module configured to generate second road information based on the generated radar data, the second road information comprising at least a detected lane based on the radar data, a calculation module configured to perform integrated calculation on the first road information and the second road information to obtain a confidence level of each candidate lane, and determine a lane of the vehicle based on the calculated confidence level, and a decision module configured to decide, based on the determined lane, whether to trigger the geofence event, wherein the geofence event comprises an event that the vehicle enters a geofence and an event that the vehicle exits a geofence, and wherein the second road information generation module is configured to fit a line-shaped pattern to a plurality of radar detection points comprised in the generated radar data, and use the line-shaped pattern as a boundary of the detected lane.

15. The system of claim 14, wherein the radar sensor comprises one or more of the following: a millimeter-wave radar, a laser radar, and an ultrasonic radar.

16. The system of claim 15, wherein the radar sensor is a long-range millimeter-wave radar mounted at the front of the vehicle.

* * * * *